July 24, 1962  M. R. KUEHNLE  3,045,529
DATA PROCESSING
Filed Sept. 14, 1959  7 Sheets-Sheet 1

INVENTOR.
MANFRED R. KUEHNLE
BY
Joseph Weingarten
ATTORNEY

July 24, 1962  M. R. KUEHNLE  3,045,529
DATA PROCESSING

Filed Sept. 14, 1959  7 Sheets-Sheet 5

INVENTOR.
MANFRED R. KUEHNLE
BY
ATTORNEY

INVENTOR.
MANFRED R. KUEHNLE
BY
ATTORNEY

FIG. 17

United States Patent Office 3,045,529
Patented July 24, 1962

3,045,529
DATA PROCESSING
Manfred R. Kuehnle, Lexington, Mass., assignor, by mesne assignments, to Iter Corporation, a corporation of Delaware
Filed Sept. 14, 1959, Ser. No. 839,648
24 Claims. (Cl. 88—1)

This invention concerns generally the subject of information storage and retrieval and relates more particularly to a random access store of film chips in which any desired chip can be rapidly retrieved for display or reproduction or both.

With the volume of paper used for conveying and storing information growing at a progressively accelerating rate there is a pressing need for data storage and retrieval systems which combine extensive capacity with reasonably short access time. While numerical data is capable of storage on tapes, drums and the like, graphic information such as maps, photographs and drawings cannot be handled by these techniques. Typically, photographs must be stored conveniently and located quickly in a newspaper office; finger prints in criminal investigation need to be readily available; drawings in an architect's work must be referred to frequently. Microfilming reduces readable information 10, 20, and 50 times in dimension and has rendered bulky materials available in a form easy to handle and inexpensive to store, but its widespread use brings with it new problems of access. The easiest way to store microfilm is, of course, to wind the film on reels. This minimizes storage space, but in turn, introduces problems arising from difficulty in maintaining such data current since the addition or deletion of stored information is both inconvenient and costly.

Chips of film have been inserted into punched cards for sorting and storage. This technique, however, is subject to the disadvantages of handling which are inherent in serial identification. Also, because the faces of the cards are coded, the retrieval apparatus must scan the face area of each card. Each card must therefore be separated from its stack, scanned, and returned to the stack in turn until the desired card is found, which in turn leads to deterioration of cards, and the chips mounted thereon, due to friction. An improved arrangement is disclosed in the copending application filed August 13, 1959, Serial No. 833,606, of Aaron Keller and Manfred R. Kuehnle, assigned to the assignee of the present application, where stacks of edge coded cards containing graphic data are scanned either optically or magnetically and selected cards are retrieved for direct viewing or graphic reproduction.

It is an object of this invention accordingly to provide apparatus representing a novel extension of the principles of the above identified prior application for rapidly detecting and retrieving a film chip having desired graphic information recorded thereon.

Another object of the invention is to provide a graphic storage medium, i.e., the film chip of this invention, having identification data different in kind from the stored data.

A further object of the invention is to provide a device in which the face of the individual film chip is not contacted during detection, retrieval, display, and replacement.

Still another object of the invention is to provide for the foregoing objects in an integrated system which is reliable, easy to use, and relatively economical in initial cost, maintenance and use.

In its basic embodiment the invention comprises a plurality of novel data carrying film chips mounted on a holding rail. The rail, in turn, forms the outer periphery of a rotatable drum. A feature of the chip is the use of a detectable coded edge striping which may be magnetic in nature, or optical if desired. Each film chip is both slidably and pivotally attached to the holding rail, and means are provided to generate a pair of angularly disposed air jets, mounted at the outer periphery of the cylindrical array of chips, directed in such a manner as to force air at the chips selectively in opposite directions.

A further feature of the invention is the provision of and appropriate transducer reading head adjacent to the coded edges of the chips, each chip edge both falling and being blown past the reading head by the combined effects of the drum rotation and of one of the air jets.

An accession device provides a chip code designation means which transmits an electrical signal equivalent of the chip code to a comparator circuit which also has an input from the reading head. In a detection run, one of the air jets, is directed at the chips and when the desired chip has passed the reading head the comparator applies a signal pulse to a control center which stops the drum. Because of the drum mass, a re-run in reverse is necessary; thus the control center turns off the detection air jet, turns on the other air jet, and reverses the drum rotation at a considerably slower speed. A synchronized selection mechanism effectively permits capture, one by one, of each of the chips that overshoot the initial pulse derived from the desired chip. When the desired chip is blown back past the reading head, the slower speed of the drum allows the pulse from the control center to stop the drum, keeping the desired chip captive. The control center then automatically provides signals which withdraw the air heads and allow the now elected chip to be placed in an associated optical system for observation. Having extracted the necessary data from the selected chip, the entire system is restored to operating condition.

These and other features and advantages of the invention will best be understood and appreciated from the following description of a preferred embodiment thereof, selected for purposes of illustration and shown in the accompanying drawings in which.

SYSTEM GENERALLY

In its basic embodiment the invention comprises a plurality of film chips 18 (preferably of commercially available microfilm) mounted on a holding rail 20, the rail forming the outer periphery of a rotatable drum 22. The chips 18 and drum 22 together comprise a magazine 24. A notch 26 at the bottom of each film chip 18 is sufficiently large in respect to the rail 20 cross-section to permit the chip to pivot or hinge substantially 90° when mounted on the rail.

The drum 22 on which the chips 18 are mounted is designed to rotate in either direction; the drum having means for securing to a shaft 28 of a suitable drive mechanism designated generally at 30. At the outer periphery of the cylindrical array of chips 18 are two angularly disposed air jets, a detection jet head 32 and an isolation jet head 34, pointed so as to alternately blow directed jets of air at the chips from opposite direction. Valve means (not shown) permit each of the jets 32 and 34 to be operated independently of the other. The two air heads 32 and 34 are arranged so that they may be physically withdrawn by suitable means from their operating position thereby permitting unrestricted access to a located chip 18A.

In the embodiment shown, the chips 18 have magnetic striping 36 on each of the long edges 38 and 40 which can be magnetized to code each chip with a unique binary pattern of magnetic bits. Magnetic transducer means 42 for reading the coded edges 38 and 40 are provided adjacent to the edges of the chips 18 when the drum 22 is mounted on the driving shaft 28, each chip being both driven and blown past the reading head 42 by the combined effect of the drum 22 rotation and one of the air jets 32 or 34.

Another part of the system is associated optical apparatus generally referred to at 44 for displaying or reproducing the desired information on the face of any particular chip 18A. The optics 44 are arranged to be capable of limited up and down travel to be out of the way during chip detection and isolation and then to move down around the particular selected chip 18A.

Completing the system are electromechanical and control elements which permit fully automatic operation. An arrangement of electrically operated brakes and clutches described in detail later in the specification permit close control over the drum drive mechanism 30. Other mechanical components 45 and 47, respectively, provide for variable positioning of the two air jet heads 32 and 34 and the optical apparatus 44.

The electronic system basically comprises the reading head 42 for sensing the code on the chips 18, an alpha-numeric accession device 46 at which the desired chip is chosen and comparator circuitry 48. The comparator 48 is an aggregation of coincidence circuits wherein electrical signals from the reading head 42 are continuously compared with a stored electrical signal corresponding to the code designation of the desired chip 18A from the accession device 46. The output of the comparator 48 is a pulse which is transmitted to a control center 49. The control center 49 then initiates a sequence of electrical signals which are transmitted to various brakes, clutches, air head valves, and air head positioning devices; and finally to a system positioner which ultimately brings the desired chip 18A into the optical system 44 for utilization.

OPERATION GENERALLY

The sequence shown in FIGS. 6–9 will illustrate generally the operation of the device described. Shown in the figures is the drum 22 containing a large number of film chips 18. The accession number of a desired chip 18A is entered into the alpha-numeric keyboard, for example, of an accession device 46 and a pattern of electrical signals corresponding to the chip 18A designation is transmitted to the comparator circuitry 48. To better illustrate the sequence, FIGS. 6–9 show the desired chip 18A as a line darker than the other chips 18 in the magazine.

Pressing a Start button initiates the sequence, the chips 18 moving at a rate, for example, of 1000 chips per second in the direction of the arrow past the reading head 42. In this phase, the isolation air jet 34 is closed off by a valve but the detection air jet 32 is on so that the chips 18 being propelled past that air head by the peripheral velocity at the edge of the drum 22 are also blown, one by one, past the magnetic reading head 42. As each chip 18 passes the reading head 42 a pattern of electrical impulses representative of the magnetic coding on the tape or striping 36 at the edges 38 and 40 of each chip 18 is transmitted to the comparator 48 which had initially received the code of the chip desired 18A.

Figure 7:
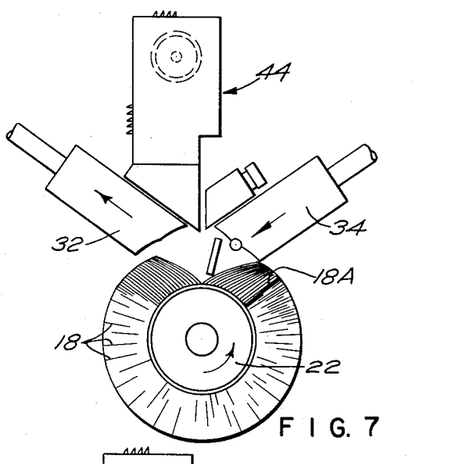
Figure 8:
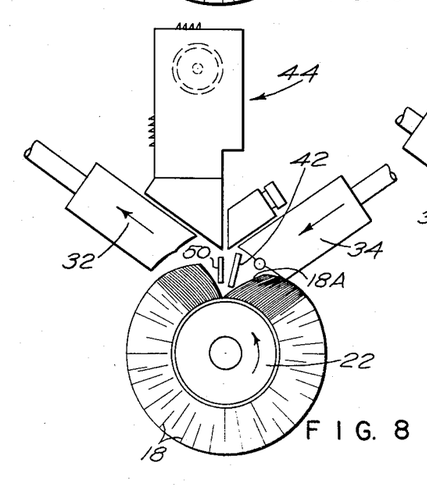

The desired chip 18A is driven and blown past the reading head 42 as indicated in FIG. 7. When the electrical impulses representing the code of the desired chip 18A reach the comparator circuit 48, that circuit in turn generates an electrical signal transmitted to the control center 49 having outputs which immediately brake the drum 20, and shuts off the air supply for the detection air jet 32. But the momentum of the drum 20 and inherent non-instantaneous braking action carries the chip somewhat past the reading head 42. Therefore, the drum must reverse direction for a second look or "isolation run." This automatically follows once the drum 20 carries the desired chip 18A past the reading head 42 for the first time. When the drum rotation is reversed, the isolation air jet 34 is turned on, the direction of the drum being shown by the arrow in FIG. 7.

The reverse rotation is at the considerably slower rate of 20 chips per second for the "second look" of the isolation run.

The reverse rotation brings individual chips 18 into a position where the combined action of a rotating trap 50 and release roller 52 cause each of the chips 18 to be read and momentarily held as they are blown by the isolation jet 34 past the reading head 42. When the comparator circuit 48 receives the signal indicative of the desired chip 18A, the trap 50 and release roller 52 are stopped with the desired chip being held against the trap by the air jet from the isolation head 34.

Circuits within the control center 49 initiate the electrical signals which cause the mechanical withdrawal of both air jet nozzles 32 and 34. The drum 22 with the desired chip 18A located and separately held can now be moved alternatively upwards to place the chip within the associated optical system 44 or that system can be moved down to the chip itself. Once the data-chip information is used, the magazine 24 and air heads 32 and 34 can be returned to their operating positions and the same procedure repeated for another chip 18.

THE FILM CHIPS, HOLDING RAIL AND DRUM

The individual film chip 18 will generally have been severed from a roll of exposed photographic or diazo film distinguished from standard film by a ferric-oxide magnetic striping 36 on the base side 54 of the film near the edges 48 and 40 thereof. The properties of the striping 36 permit transverse magnetization of segments, each segment representing a single bit of a code, the various patterns of magnetization being different for each of the chips 18. For example, a standard chip of 16 mm. film would be approximately two inches long and could have thirty code bits on each of the edges 38 and 40. This allows for combinations totaling $2^{60}$ and means that a decimal alphanumeric code might be used avoiding the need for decimal-binary conversion equipment.

A single chip 18 is further distinguished from a mere segment of photographic film both by its profile and the notch 26 cut out from one of the uncoded edges thereof. Referring first to the profile, near each edge 38 and 40 between the two magnetic stripes 36, the chip 18 is deformed in a manner to form ridges 56 and 58 on the base side 54 of the film. This profiling may take many different forms, but its basic function is to provide stiffness over the length of the chip thereby lessening effects of unpredictable deformation during the detection-isolation process. Clearly, other profiles will stiffen the chip as will the addition of other external stiffening means.

To permit mounting on the rail 20 a notch 26 is cut at an uncoded edge of each chip 18 which has a configuration comparable to the cross section of the T-shaped upper part of the holding rail. While the configurations are comparable, the notch 26 itself is somewhat larger than the rail 20 dimensions to allow substantial pivoting or hinging to either side; hinging which provides at least 45° difference from the vertical upstanding position of the chip.

The rail 20 itself consists of two sections of identically shaped metallic or plastic material formed into a circular array to fit on the rotatable drum 22. The particular cross section configuration of the top of the rail 20 is important insofar as it allows the chips to be kept in place during the dynamic operations of detection and isolation; and while the chips 18 must be held to the rail they must be able to hinge or pivot readily, and to be displaced by the combined action of the drum 22 velocity and air jet action.

Figure 1:
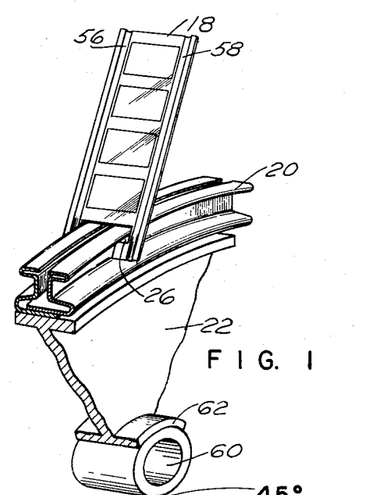
FIG. 1 is a perspective view of a section of a drum, a peripheral chip holding rail mounted on the drum, and a film chip mounted on the rail.
Figure 2:
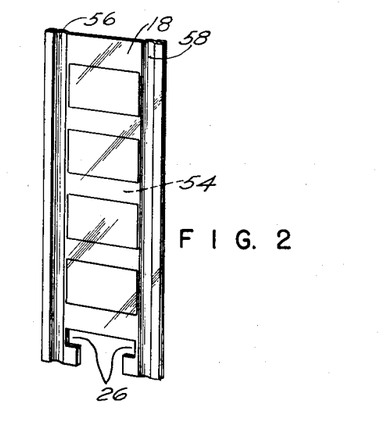
FIG. 2 is a perspective view of the base side of a film chip showing the mounting notch at the bottom thereof.
Figure 3:
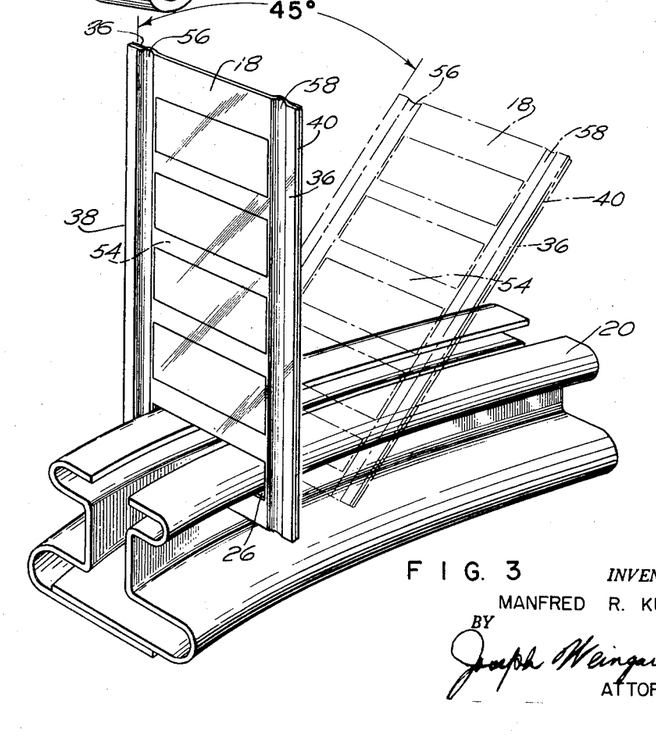
FIG. 3 is a considerably enlarged perspective view of part of a holding rail showing an upstanding chip mounted on the rail with the same chip in phantom shown hinged 45° from vertical.
Figure 5:
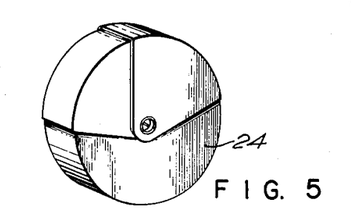
FIG. 5 is a perspective view of the chip magazine cover wholly enclosing the drum and its chips.
Figure 6:
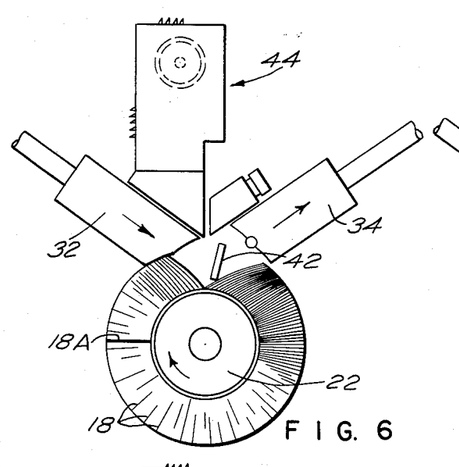
FIGS. 6–9 are diagrammatic views of a rotating drum of chips, a reading head, detection and isolation air jet heads and an associated optical system. The four figures are a sequence indicating how a desired chip (dark line) in FIG. 6 is started past the reading head, the motion is reversed in FIG. 7, the chip is caught by a trap is FIG. 8, and then positioned to receive the optical apparatus in FIG. 9.
Figure 10:
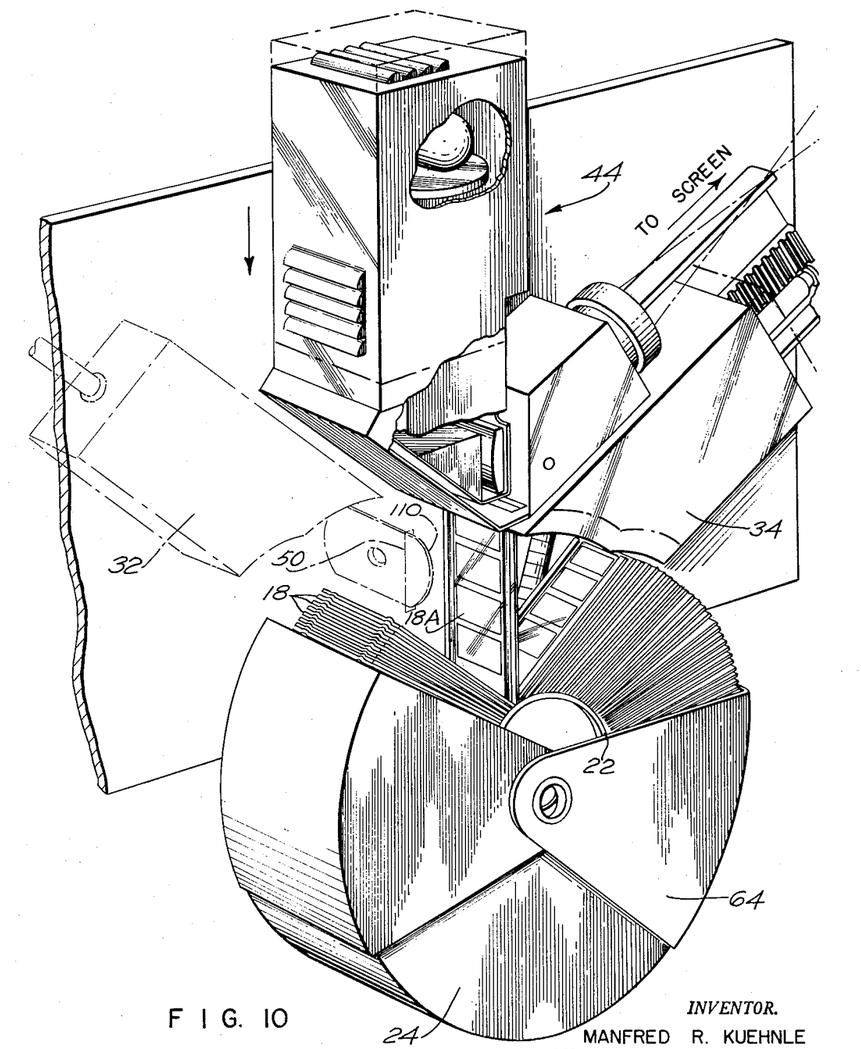
FIG. 10 is a detailed perspective view of a film chip drum in its magazine, with a located chip entering the optical system.

As already noted, the holding rail 20 forms the outer periphery of the rotatable drum 22. As will be seen in FIG. 1, the drum 22 is basically a shallow cylinder having a central opening 60 with a collar 62 for rapid but reliable mounting and demounting on the rotatable shaft 28. As shown in FIGS. 5 and 10 the drum 22 mounting a plurality of film chips 18 may in turn be placed within a case 64 to form an openable magazine 24 as a complete unit suitable for both chip storage when the case is closed and chip selection when the magazine is mounted on the shaft 28 of the selection apparatus.

FIG. 10 illustrates how the chips 18 are packed on the rail 20 to permit hinging between adjacent chips of approximately 90°. The importance of this will be described in some detail below, however, it has already been stated that the principle of the selection process requires a chip 18 to be driven past a particular fixed point and blown away from the adjacent chip at the same moment. As drum 22 turns in either the forward or reverse direction, the chips 18 are piled up together at an oblique angle to the rail 20. As the chips are carried into either air jet 32 or 34 each chip necessarily hinges approximately 90° from one oblique position to the other oblique position past the reading head 42.

MAGAZINE DRIVE

Figure 4:
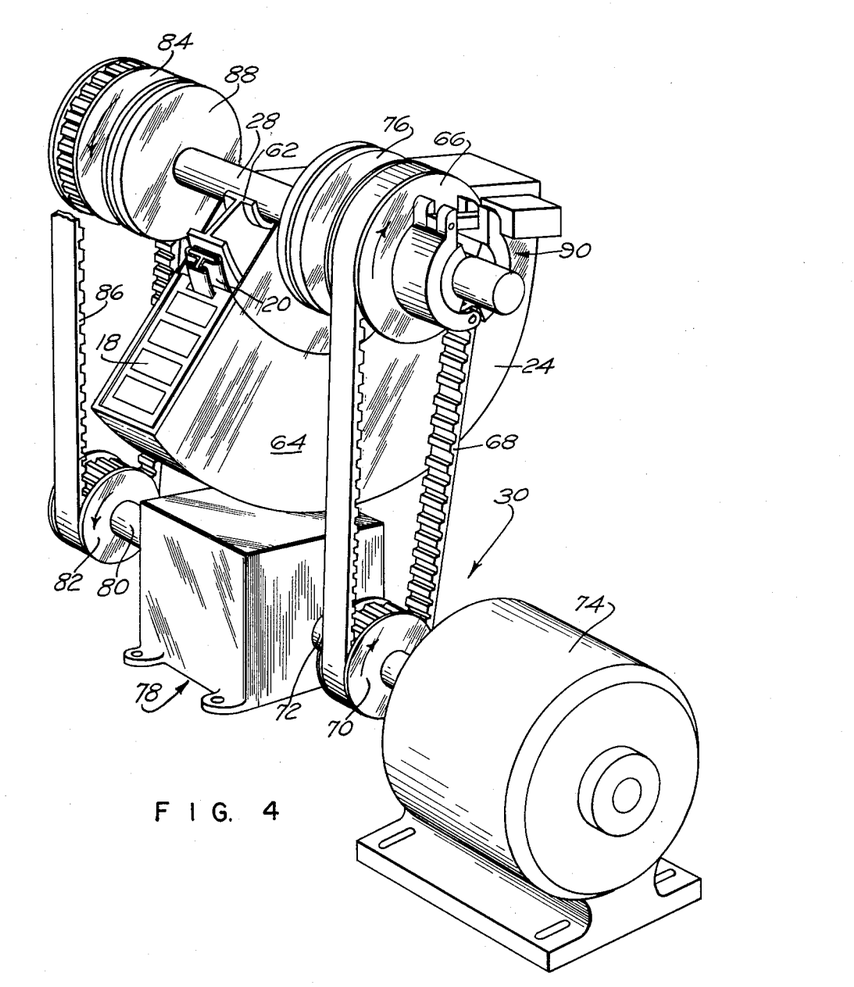
FIG. 4 is a diagrammatic perspective view of the drum drive mechanism showing a drive motor, reversing gearbox, pulleys, brake and clutches, and a chip magazine shown cutaway in operating position.

The perspective cutaway view shown in FIG. 4 illustrates the basic magazine drive 30 requirements of the system. The film chip magazine 24 is arranged to fit on a shaft 28 in a manner permitting convenient mounting and demounting therefrom. The shaft 28 has a detection drive pulley 66 connected by a toothed belt 68 to a smaller pulley 70 attached to a shaft 72 of a drive motor 74. The detection drive pulley 66 rotates the drum 22 and chips 18 within magazine 24 in the direction shown by the arrow through a clutch 76 interposed between the pulley and the shaft on which the magazine turns.

The isolation run, which is in the opposite direction, is made possible by gearing down the same motor 74 in a gearbox 78 to lower the speed to approximately $\frac{1}{50}$ of the detection run and at the same time reversing the direction of the device. The gearbox 78 output is a shaft 80 on which a pulley 82 is attached. An isolation drive pulley 84 driven by a toothed belt 86 from pulley 82 is connected to the magazine 24 through a clutch 88. The motion of the drum 22 is stopped upon disengagement of either clutch 76 or 88 by a brake 90 shown diagrammatically.

AIR JET HEADS

(a) Detection Air Head

The detection-isolation air jets emanate from detection and isolation air heads referred to above and generally designated by the numbers 32 and 34 respectively.

Figure 9:
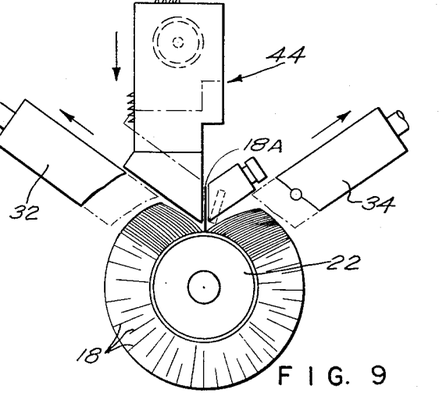

As indicated in FIGS. 9 and 10 both of the heads 32 and 34 are variably positionable in respect to the position of the rotating drum 22 containing the film chips 18. This provides adjustment of the respective air jets when they are in operative position and also allows withdrawing the air heads along suitable tracks to clear the way when the optics 44 are moved downwardly around the selected chip 18A.

Figures 12, 12A:
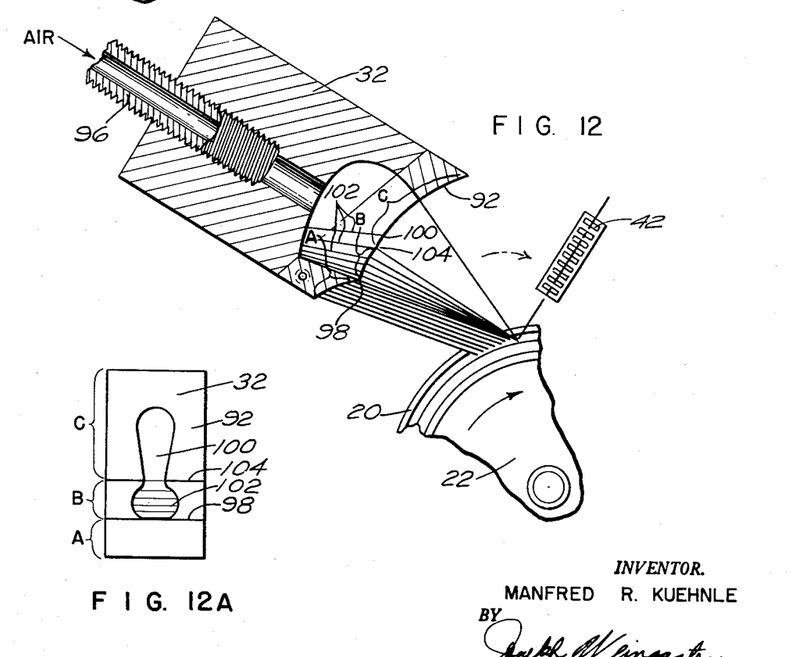
FIG. 12 is a side view of the detection air jet head shown in its operating position with the moving film chips.
FIG. 12A is a front view of the detection air head showing the vanes which cause an angular gradient within the jet stream.

FIG. 12 shows the detection air head 32 which directs a jet of air into the chips running past the face 92 thereof during the detection run. An air source 94 connects through suitable tubing 96 to the head 32. The control of the air supply is provided by conventional solenoid valves (not shown). The drum 22 on which the chips 18 are mounted is shown in clockwise rotation as indicated by the arrow in FIG. 12, the hingeable chips 18 laying back against one another in an oblique position due to centrifugal force and the ambient air pressure.

The external pneumatic system (not shown) is arranged so that air being supplied to either one of the heads 32 or 34 is simultaneously being withdrawn by suction at the other air head. A substantially closed pneumatic circuit can be achieved and the addition of a filter in the circuit insures that the air jet will be free of abrading dust particles.

The purpose of the air jet issuing from detection head 32 is to insure that only one chip 18 will pass the reading head 42 at any given instant. This is accomplished by the air jet causing the individual chips 18 to pivot or hinge from a first oblique position to a second, opposite oblique position.

During the detection run, a number of different pneumatic conditions are caused to exist in the jet from air head 32 so that only one chip at a time will pivot past the reading head 42. The area marked "A" as indicated in FIG. 12 is a pile-up area. Here the chips 18 make physical contact with the air head face 92, the chips being physically urged to have a distinct overlap to make certain that they enter the next area, area B, one by one. Area B, a pre-separation area, begins at the point 98 where the angle of the air head face 92 is slightly different from the pile-up face angle of area A so that the chips 18 can fan out as shown in FIG. 12.

FIG. 12A shows an aperture 100 for the air jet divided by a series of vanes 102 adjusted to blow air in the exact direction of the moving chips 18 in order to move them to a release edge 104. The pitch between adjacent vanes 102 increases to broaden the space between adjacent air jets further assuring individual release of each chip 18 in succession. From the border 104 between area B and an area C, a chip 18 hinges free without any friction on the head 32, accelerated by an increasingly tangential air flow from the air jet opening 100. The chip's pivotal motion continues while it enters the area of free travel, area C, and ends with the chips at rest in the opposite oblique pile of chips after hinging through approximately 90°.

(b) Isolation Air Head

The desired chip 18A upon passing the reading head 42 initiates a signal through the comparator 48 and control center 49 which stops the drum 22. But due to the inherent lag time in the response of the electro-mechanical system and because of the mass, momentum and velocity of the magazine 24, the desired chip 18A is carried beyond the point where it can be brought adjacent with the associated optical system 44.

As shown in FIG. 7, when the chip 18A having the desired code has moved past the magnetic reading head 42, the magazine's rotation is halted, the detection air jet is shut off and air withdrawal begins; air is then permitted to flow to the isolation air head 34. The magazine is then rotated considerably more slowly in the reverse direction.

Figure 11:
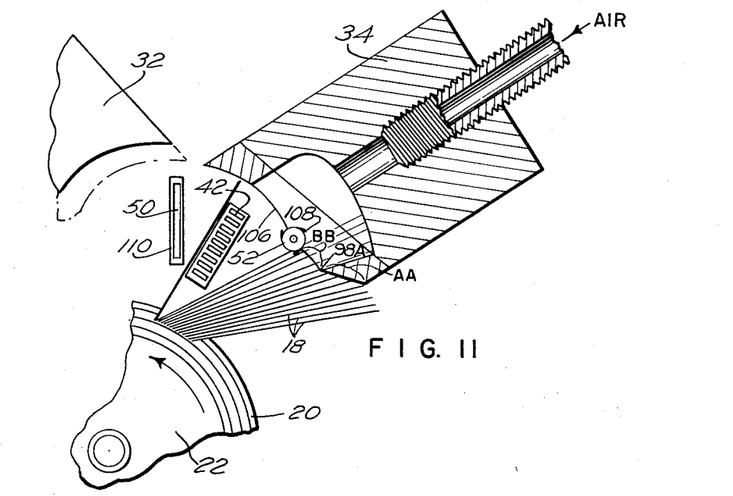
FIG. 11 is a side view of the isolation air jet head and the chip release roller in operating position in respect to the rotating drum of film chips.

Referring now to FIG. 11 a detail is shown of the chip 18 isolation precedure. The isolation air head 34 has a face 106 almost identical with the face 92 of the detection air head 32. The tops of the chip 18 make frictional contact at the area of the face 106 designated AA. At edge 98A they are riffled and further separated by the air jets at BB.

Having been separated the chips 18 encounter the release roller 52 the rotational speed of which is synchronized with the drum 22 rotation and the action of the trap shutter 50. The roller 52 has shallow teeth 108 which momentarily hold back the pile of chips while one chip passes the reading head 42. As a chip 18 is carried and blown past the reading head 42, the rotating trap 50 emerges from a slot 110 to momentarily engage and impede the chip; the air jet from isolation head 34 holding the chip against the trap until the trap is withdrawn. It should be noted that the use of release roller 52 is optional. In many combinations of drum rotation speed, air jet intensity and chip size, single chips are readily separated sequentially and blown against the trap 50, without the need for the release roller, the isolation air head 34 being identical, therefore, with the detection head 32.

This action is repeated for each chip 18 until the desired chip 18A is carried up by drum rotation and the isolation air jet. The comparator 48 for this chip 18A transmits a signal pulse to the control center 49 which causes the drive mechanism 30 to brake the drum 22 rotation. Because the drum has been turning at a much slower rate in the isolation re-run than in the detection run, the braking action is practically immediate. Along with the braking action of the drum, the trap 50 remains in place holding the chip 18A in conjunction with the air jet from head 34.

THE ELECTRICAL ARRANGEMENT

Figure 17:
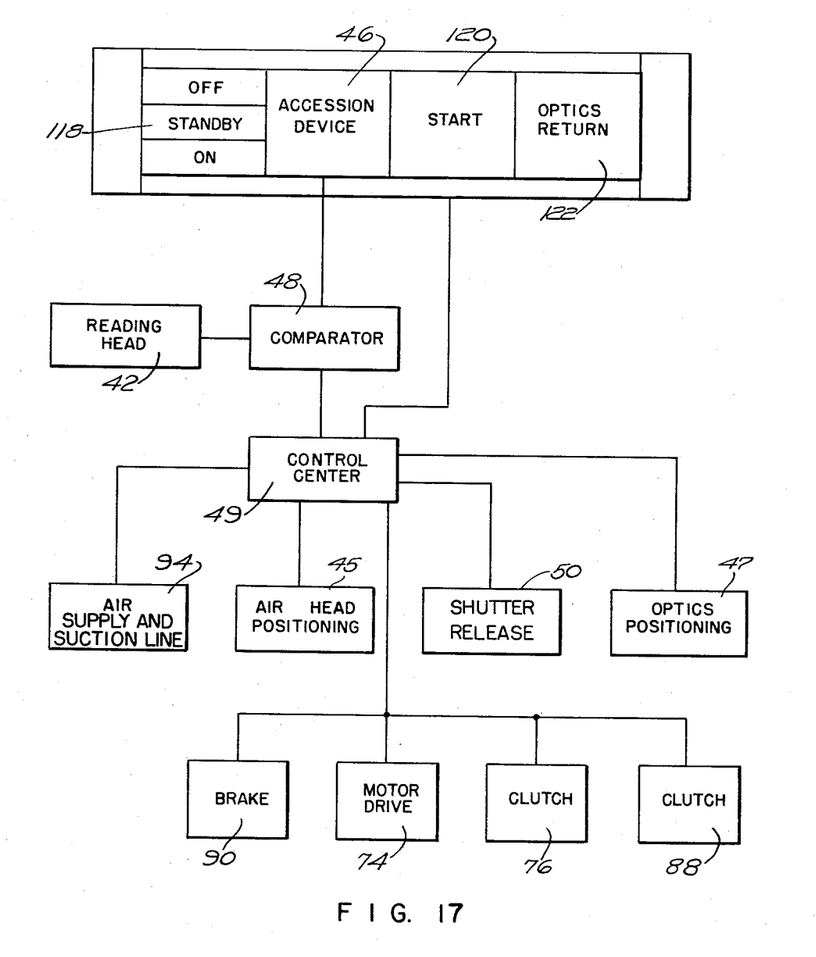
FIG. 17 is a basic functional block diagram of the control system of the invention.

The electrical arrangement of the invention is illustrated in block diagrammatic form in FIG. 17. The sensing device or reading head block 42 transmits its output signal to the comparator 48. The accession device or code selector 46 also makes connection with the comparator.

The accession device 46, with an alpha-numeric switchboard, can be used to select a particular chip 18A; the output of this device is an electrical waveform having a unique pattern which is transmitted and, in a sense, stored or remembered by the comparator 48.

The comparator 48 is an aggregate of circuits which compares the output signal from the accession device 46 with the output signals from the reading head 42, generating its own output signal when the pattern of signals from the reading head coincides with the pattern of signals from the accession device. The comparator 48, by way of example, may include a number of coincidence circuits equal to the number of bits in the code employed on the edge surfaces 38 and 40 of each chip, each of those coincidence circuits being arranged to provide an output signal only when the input signal from the accession device 46 corresponds to the input signal from the reading head 42. The outputs of the coincidence circuits may be tied to a logical "and" circuit, the latter providing an output in response to simultaneous input signals from all the coincidence circuits. Other types of comparators 48 are suitable for use in this invention and it is to be understood that the specific internal construction is immaterial to the invention so long as the system as a whole functions in the manner previously described.

One group of output signals from the control center 49 are transmitted to the drum drive mechanism 30 comprising motor 74, clutch 76, clutch 88 and brake 90. Other output signals are transmitted to the valves (not shown) controlling the air supply 94 to the two air heads 32 and 34, the trap 50 and release roller 52. This same signal sequence initiates the action of apparatus forming no part of this invention by which the optical system 44 is moved downwardly around the located chip 18A for projection thereof.

The operation of the sensing device or reading head 42 and its relationship with the electrical-mechanical system deserves more detailed consideration. The coding and sensing of a chip 18 is shown in detail in FIGS. 13–17.

Figure 15:
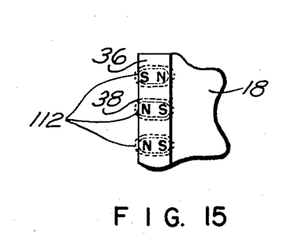
FIG. 15 is a view of a section of a chip edge showing schematically three transversely magnetized segments creating three code bits.
Figure 15A:
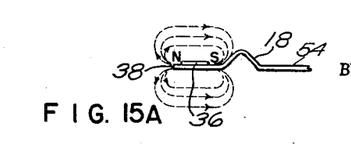
FIG. 15A is a diagrammatic end view of the magnetic flux at the edge of a chip.

As previously indicated each chip 18 has on the base side 54 thereof a stripe of magnetic material 36 near each of the edges 38 and 40. The position of the stripe 36 near edge 38 on the base surface 54 is shown in FIG. 15A.

The chips 18 may be coded in any binary system or variant thereof by arrangements well known in the art. Only three bits 112 are indicated in FIG. 15 but using a straight binary arrangement, a 16 mm. chip approximately 2" in length can be readily coded with thirty bits, for example, on each of the edges 38 and 40 permitting a total of $2^{60}$ differently coded chips 18 using a simple binary code system. A single commercially available reading head unit provides fourteen channels or individual sensing elements 114 for each edge 38 and 40 of a chip 18.

Figure 13:
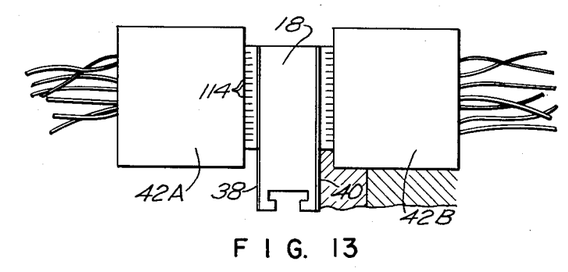
FIG. 13 is a view of a film chip passing between the two magnetic reading heads.
Figure 14:
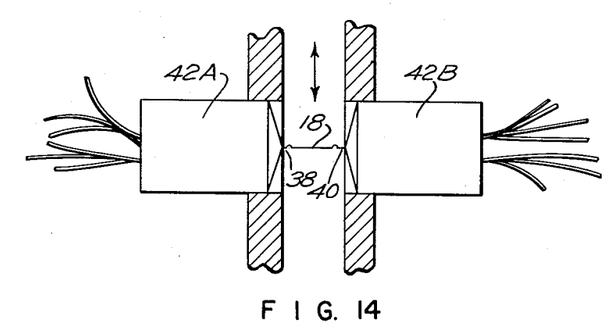
FIG. 14 is a top view of a film chip passing between the two magnetic reading heads.

FIGS. 13 and 14 indicate the feasibility of actually employing two reading heads 42A and 42B for edge sensing and further indicate how each of the edges 38 and 40 are disposed at the top of the chip arc relative to the sensing unit 42 taken as a whole.

It is to be emphasized that the chip 18 will be sensed by the heads 42A and 42B regardless of its direction between the heads. The difference in the signal for a single chip 18 sensed in either direction is a difference in polarity. Since the comparator 48 compares the reading heads 42A and 42B output with the input from the accession device, when the rotation of drum 22 is reversed, a conventional phase inverter circuit is placed in circuit between the reading head 42 and the comparator input.

While the magnetic strip 36 is clearly on the surface 54 of the chip, it is also very near the edges 38 and 40 thereof. It is possible, of course, to have the magnetic material primarily on the thin edge 38 itself and read the coding recorded thereon from off the edge by a sensing device. But it has been found more satisfactory to use the edge surfaces striping as already mentioned, that is, a stripe on the surface, but near the edge of a chip, and yet still to sense the magnetization pattern recorded on the stripe with a sensing device disposed adjacent the chip edges.

The magnetization of the striping 36 is transverse to the stripe length the result being a pattern diagrammatically shown in the chip fragment of FIG. 15. The detail of 15A gives a clear picture of the magnetic flux line distribution and it is to be noted that a considerable flux exists at and beyond the edge 38.

Figure 16:
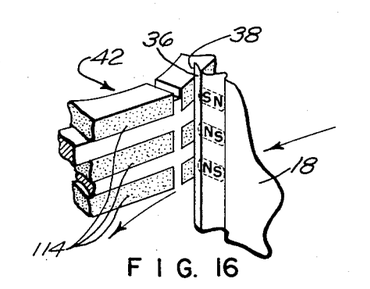
FIG. 16 shows in perspective a cutaway portion of a single reading head with three magnetized bits of the segment of FIG. 15 passing three of the sensing elements of the reading heads.

In FIG. 16 the chip fragment of FIG. 15 is shown passing three sensing elements 114 of the reading head 42 during its arc hinging between its two oblique positions.

The three magnetized bits 112 when adjacent the gaps in the sensing elements 114 have an effect which is largely dependent on the polarity of magnetization of each bit. Transverse surface magnetization, in other words, permits sensing the particular magnetic orientation from the edge of the chip.

CHIP VIEWING

Once the desired chip 18A has been isolated from amongst the plurality of chips 18A it is necessary to project and enlarge the image on the film. The optical apparatus 44 can be any suitable arrangement of a light source, prisms and lenses which will project the film image to a screen somewhat away from the chip magazine 24 and rotation equipment 30 area. In FIG. 9 the located chip 18A is shown within an associated optical optical system 44. This is accomplished by lowering the optics 44 which are up and out of the way during the detection-isolation stages downwardly in the direction of the arrow.

At the termination of the isolation run, the located chip 18A is held against the trap 50 by the jet from air head 34. The two air heads 32 and 34 are then both moved away from the drum as shown in FIGS. 9 and 10 to permit the unimpeded downward movement of the optical system 44 around the chip 18A. The air supply 94 for head 34 is continued while that head is being withdrawn to keep the chip 18A against the shutter 50, and continues until means, such as rollers (not shown), within the optical system 44 itself engage the chip.

OPERATION

Any desired chip 18A amongst the plurality of chips 18 in a magazine 24 may be located in a few seconds. Pushing a standby button 118 supplies air from air supply 94 to the detection head 32 and suction to the isolation head 34, both of which are in operating position, and turns on drive motor 74. The two clutches 76 and 88 are normally disengaged so that no motion is as yet imparted to the drum 22.

The accession number for a desired chip 18A is set into the alpha-numeric accession device 46 by program switches or punched tape or any other comparable means. The output of the accession device 46 is a unique pattern of electrical signals corresponding to the unique pattern of magnetized bits 112 on the two edges 38 and 40 of the desired chip 18A. This output signal is carried along a suitable cable to the comparator block 48 which embraces appropriate coincidence circuitry and buffer memory for retaining the code of the desired chip 18A.

Actuation of a Start button 120 completes a circuit in the control center 49 which then causes clutch 76 to be engaged, coupling the presently turning detection drive pulley 66 to magazine 24 and turning the drum of chips 18 past the reading heads 42A and 42B.

The coded accession number or designation of each chip 18 which has been recorded upon the ferric-oxide striping 36 on the chip surfaces near the edges is sensed by the reading heads 42A and 42B as the chips are carried near the heads and caused by the air jets to pivotally arc past the heads. As each chip 18 is sensed, an electrical signal corresponding to the code is transmitted to the comparator device 48. When the electrical signal in the comparator 48 coincides with the electrical signal pattern from the reading heads 42A and 42B, then and only then does the comparator initiate a signal pulse. This signal is transmitted to control center 49 which in turn, generates pulses causing a sequence of events as outlined below.

The brake 90 is energized and clutch 76 is disengaged to stop the drum 22 rotation and disconnect the drive means 30. At the same time the air supply 94 to the detection air head 32 is shut off and reversed; air being supplied to the isolation air head 34 and suction to head 32.

At this moment the detection run so-called is completed and isolation of the desired chip 18A just detected is required. Because of the speed of the detection process in the order of 1000 chips per second the drum 22 rotates at a fairly high velocity. As a result, even though the comparator 48 signal pulse is practically instantaneous when the desired chip 18A has passed the reading heads 42A and 42B, the braking action and clutch disengagement cannot inherently be instantaneous; also, the momentum of the drum results in the desired chip overshooting or going past the reading heads by a number of film chips. Thus, the need for a reverse or isolation run, is evident.

Because the overshoot is generally only by a few chips compared to the total store on the drum 22 this isolation run can be much slower compared to the detection run. If the detection run is, for example, 1000 chips per second the isolation run may be approximately 20 chips per second.

Once the drum 22 is stopped and the detection air jet is off, the reverse cycle is initiated. The pulse sequence from the control center 49 causes brake 90 to be released and clutch 88 to be engaged. The drum 22 is then driven, in the direction of the arrow on drive pulley 84, from the gearbox shaft 80 through belt 86.

At the same time that the drum 22 is stopped and reversed the isolation air head 24 is supplied with air from the air source 94. As already noted in discussing the isolation air head apparatus 34, the motion of the chips 18 in this phase of operation is controlled not only by drum 22 rotation and the air jet action. The shallow teeth 108 of release roller 52 pick up each chip 18 separately from the pack, gently urging the chip into the air stream and then hold back the next adjacent chip. Synchronized with this action is the trap or shutter device 50 which comes out of its slot 110 and against which the chips are blown one by one and held engaged momentarily after passing the reading heads 42A and 42B.

This sequence continues until the desired chip 18A is blown and carried past the reading head 42 when again the comparator 48 has a signal identical with that stored.

The air jet from head 34 holds the chip 18A against shutter 50 while the release roller 52 keeps the adjacent chips 18 from being carried into the isolation air stream. The output signal pulse from the comparator 48 actuates brake 90 and disengages clutch 88, thus halting the rotation of the drum. It should be noted at this time that the air jet from the isolation head 34 is still operative.

Next in the sequence is the physical withdrawal of both air heads 32 and 34 from near the drum 22. Since the isolation air jet 34 is still operating, the chip 18A is still held against the shutter 50; sufficient air pressure is available to keep the chip 18A in place against the shutter during withdrawal.

When the two air heads 32 and 34 have sufficiently withdrawn the optical system 44 is moved vertically down a short distance, the desired chip 18A now isolated at the top of the drum 22 being grasped by rollers (not shown) which operate in conjunction with the optics or any other suitable apparatus, the chip being placed within the associated optical system 44 for either viewing or reproduction or both. Once chip holding means in the optical system 44 have secured the chip 18A, the air supply to isolation head 34 is shut off.

When the operator is finished with the particular chip 18A, he operates the optics return button 122, actuates optics positioning means 47, the drum 22 returns to the rotational situation, the chip shutter 50 is withdrawn, and the two air heads 32 and 34 are returned to their operating positions.

It will be clear to those skilled in the art that modifications of the embodiment of the invention described herein can be made without departing from the spirit of the invention as defined in the appended claims.

What is claimed is:

1. Apparatus for selecting a predetermined data-bearing film chip from a plurality of film chips each of which has a coded edge surface, said apparatus comprising in combination: means for pivotally mounting each of said chips at an uncoded edge thereof whereby said coded edges are coplanar, sensing means disposed in operative relation with said coplanar edges for sensing said edge codes, means for producing relative motion between said chips and said sensing means, pneumatic means for causing each of said chips to sequentially pivot one at a time as each chip is adjacent said sensing means, means for stopping said relative motion when a chip having a predetermined code passes said sensing means, and means for sensing the data borne on said predetermined chip.

2. A generally rectangular film chip adapted to be supported by a holding rail, said chip having for identification purposes a code on a planar surface near an edge thereof, means on an uncoded edge arranged to allow hingeable and slideable mounting on said holding rail, and means for stiffening said chip over the length thereof, said last-mentioned means comprising a deformation of said chip lengthwise near opposed long edges thereof.

3. A device for locating one information carrying film chip among a plurality of such chips stacked in a magazine, each of said chips in said magazine having an identification code on a planar surface near an edge thereof, the coded edges of said chips being adjacent in said magazine, chip selection means providing an electrical signal output identifying the code of a desired chip, a sensing device adjacent said chip edges for sequentially sensing said codes of said chips, means for producing relative motion between said coded edges and said sensing device, means including an air jet for sequentially causing the coded edge of each of said chips to be in operative spatial relation with said sensing means one at a time, and means for indicating when said sensing device has an output signal comparable to the signal from said selection means.

4. Data handling apparatus comprising: a plurality of film chips each having a coded surface near an edge, said chips being arranged in a magazine, a reading head for sensing said coded edges at their edges, motive power means for traversing said magazine along a predetermined path operatively disposed to said reading head, means including an air jet positioned to separate said chips as they approach said reading head whereby they may be separately read by said reading head, and means for stopping said magazine when a film chip bearing a predetermined edge code has passed said reading head.

5. In a data handling system, the improvement comprising: a plurality of film chips, an identification code arranged along an edge surface of each of said chips, a mounting means for said chips for hingeably holding said chips with their coded edges aligned in closely adjacent proximity but with a portion of said mounting means vacant of said chips whereby each of said chips can sequentially be hinged from a first to a second oblique position, sensing means for said coded edges, means for producing relative motion between said mounting means and said sensing means, and air jet means for moving each chip brought near said sensing device by said relative motion past said sensing device whereby to cause said chip to hinge from its first to its second oblique position.

6. A system for automatically selecting one of a plurality of edge coded film chips of identical configuration arranged in a magazine with coded edges in alignment, said coded edges each including a strip of magnetizable material, each of said edge codes identifying the respective chip and formed by a pattern of magnetized areas in the respective strip of magnetizable material, a magnetic sensing device disposed in operative relation with said magnetically coded edges, means for moving said magazine relative to said sensing device, means including an air jet for separating said chips whereby to cause them to be sensed by said sensing device one at a time, and means responsive to the output of said sensing device for isolating in said magazine a chip having a particular code.

7. A data handling system of the type for retrieving a predetermined data-bearing film chip from a plurality of coded film chips in a magazine, comprising: a sensing device, motive power for said magazine whereby said coded chips are carried past said sensing device, air jet means for causing a single chip at a time to pass said sensing device, said sensing device arranged to sequentially detect the code on each of said chips and provide first electrical signals corresponding to the detected code, a code selector for providing second electrical signals identifying the code of the chip to be retrieved, a comparator for continuously comparing electrical signals derived from said sensing device and said code selector, said comparator providing an output signal when for a predetermined chip said compared signals coincide with that of said code selector, control means responsive to said output signal for terminating the motion of said magazine, an optical viewing system, and means further responsive to said output signal for relatively moving said predetermined chip and said optical viewing system for optical presentation of said data thereon.

8. The system defined in claim 7, said magazine moving means being arranged to move said magazine rapidly in one direction when said sensing device is detecting the code on each chip, and to move said magazine slowly in a reverse direction after the momentum of said magazine has caused said predetermined chip to pass said sensing device, and further including a first air jet disposed in operative juxtaposition to said chips moving past said sensing device in one direction for causing each of said chips to sequentially be sensed by said sensing device one at a time, and a second air jet disposed in operative relationship to said chips moving in a reverse direction.

9. A data handling system of the type for retrieving film chips having magnetically coded edge surfaces, a holding rail for said chips arranged to permit hinging and sliding of said chips when mounted thereon, means for moving said holding rail in a forward direction and a reverse direction along a predetermined path, sensing means operatively adjacent to said predetermined path for sequentially detecting the code on each of said chips and providing first electrical signals characteristic thereof, first and second air jet means, said first air jet means arranged to cause hinging of said chips past said sensing device when said chips are moving in said forward direction, said second air jet means arranged to cause hinging of said chips moving in said reverse direction, a code selector for providing second electrical signals identifying the code of the chip to be viewed, a comparator for continuously comparing said electrical signals derived from said sensing device and said code selector, said comparator providing an output signal when for a predetermined chip said compared signals coincide, control means responsive to said output signal for governing the motion of said holding rail whereby the latter is stopped after a predetermined chip thereon has passed said sensing device, further control means sequentially reversing the motion of said holding rail whereby said predetermined chip is again carried past said sensing device, and means actuated upon termination of said reverse holding rail motion for isolating said predetermined chip.

10. A data handling system of the type for viewing coded film chips comprising a plurality of edge coded chips, said chips being of like configuration and hingeably but densely mounted on a rotatable holding rail with coded edges in alignment, a reading device for sensing the code on said edges, means for rotating said holding rail rapidly in a forward direction past said reading device and slowly in a reverse direction, a detection run air jet and an isolation run air jet, said detection jet being directed at said chips in said forward direction causing said chips to hinge sequentially and one at a time past said reading device, said isolation jet being directed at chips in said reverse direction causing said chips to hinge sequentially and one at a time past said reading device, said reading device being disposed in operative relation with said coded edges to provide sequential electrical signals corresponding to the detected codes, a code selector for providing electrical signals identifying the code of the chip to be viewed, a comparator for continuously comparing said detected electrical signals derived from said reading device and said identifying signals from said code selector, said comparator providing an output signal when for a predetermined chip said compared signals coincide, control means responsive to said output signal for governing the motion of said holding rail whereby said rail is stopped in its forward run after said predetermined chip on a first occasion passes said reading head, further control means sequentially reversing the motion of said rail, means operative in said reverse direction for releasably engaging each of said chips passing said reading device in the reverse direction, and control means responsive to said output signal from said comparator for stopping said rail motion after said predetermined chip passes said reading device, and stopping said means engaging said predetermined chip whereby said chip is made available for viewing.

11. Apparatus for locating a desired film chip among a plurality of similar chips comprising in combination: a stack of closely packed edge coded film chips, each of said chips being pivotally mounted at one of its non-coded edges on a holding rail, a sensing device for reading said coded edges, means for relatively rapidly traversing said holding rail with the coded edges of said chips operatively adjacent said sensing device in one direction for a detection run, a detection air jet riffling said chips approaching said sensing device during the detection run and further causing only one chip at a time to pivot when adjacent said sensing device, means for stopping said holding rail when a desired chip has passed said sensing device, means for traversing said holding rail in the opposite direction relatively slowly for an isolation run, means for releasably engaging each of said chips passing said sensing device during the isolation run, means for stopping said oppositely traversing holding rail precisely at the desired chip, and means for continuing engagement of the desired chip when it passes the sensing device during said isolation run.

12. A data handling system comprising the combination of a rotatable drum, a plurality of magnetically edge coded film chips, each of said chips having an open T-shaped notch formed in one uncoded edge thereof, a T-shaped holding rail at the periphery of said drum for coacting with said T-shaped notches and supporting said chips for hinged movement between a first position and a second position, a reading head for sensing the codes on the edges of said chips, means for rotating said chips on said drum relatively fast in a forward direction and relatively slowly in a reverse direction, a first air jet means operative during forward rotation of said drum for sequentially and individually blowing said chips past said reading head, means for reversing said drum rotation when a desired chip passes said reading head on a first occasion, a second air jet means operative during drum rotation in said reverse direction for sequentially and individually blowing said chips past said reading head, means for stopping said drum when said desired chip thereby passes said reading head on a second occasion, and means for keeping said desired chip isolated from the remainder of said plurality of chips when said drum is stopped.

13. A system for handling film chips comprising the combination of a plurality of film chips, each of said chips having magnetic codes on an edge surface thereof and being formed with an open notch in an uncoded edge, a holding rail for said chips having an operative portion cross-section comparable to the shape of but smaller than said notch whereby said chips when mounted on said operative portion can easily hinge from a first oblique position to a second oblique position without falling from said portion, means for sensing said magnetic codes on the edges of said chips, means for causing relative motion between said reading head and said chip edges in a forward direction for a detection run, means for causing corresponding relative motion in the reverse direction for an isolation run, a detection run air jet means and an isolation air jet means, said detection jet means being operatively disposed to sequentially cause each of said chips to move from said first oblique position to said second oblique position when the respective chip is adjacent said reading head during said detection run, said isolation jet means operatively disposed to sequentially cause each of said chips to move from said second oblique position to said first oblique position during said isolation run, and means responsive to the magnetic code on a predetermined chip for terminating said detection run and initiating said isolation run, and for thereafter terminating said isolation run.

14. A film chip magazine comprising, a drum, a film chip holding rail secured on said drum at the outer periphery thereof, and a plurality of film chips each pivotally and slidably mounted on the outer periphery of said holding rail, each film chip having an identifying code along an edge surface thereof spaced from said holding rail.

15. A substantially rectangular film chip adapted for support upon an external holding means, said chip having means on a planar surface near a first edge thereof arranged to form a code, means on an uncoded second edge thereof for making pivotal slideable connection with said holding means, and means for stiffening said chip along the dimension substantially perpendicular to said second edge thereof.

16. In a data handling system wherein a plurality of film chips supported upon a rotatable drum are sequentially carried across a sensing device, a source of air pressure, an air jet head having an air jet opening on a face thereof adjacent the edges of said chips, and means connecting said air pressure source to said air jet head, said air jet opening being divided by vanes having a gradually increasing pitch whereby air emerges from between said vanes at gradually increasing angles providing a gradient of increasingly tangential force at the edge of each successive passing chip.

17. The structure defined in claim 16, said air jet head being further characterized by having on said face a chip contacting surface and a chip release surface, said chip contacting surface disposed to engage the edges of said chips whereby said chips are caused to overlap, said air jet from said air jet opening causing positive separation of said chips and causing each chip to sequentially pivot when said chips are adjacent said release surface.

18. An air jet head having the structure of claim 17 and further including a roller protruding from said face, said roller having shallow teeth along the length thereof, said roller turning in synchronism during reverse rotation of said drum, said teeth being adapted thereby to sequentially and synchronously release the chip then nearest said sensing device.

19. A data handling system for selecting a predetermined film chip from a plurality thereof comprising the combination of a reversibly rotatable drum of film chips, a sensing device, a forward detection air jet coacting with forward rotation of said drum for causing said film chips individually and sequentially to pass said sensing device, a reverse isolation air jet having a chip release roller, control means responsive to said predetermined chip passing said sensing device: said combination further including a film chip trap operatively positioned with regard to said isolation air jet during reverse rotation of said drum and synchronized with said release roller, said trap momentarily engaging each of said chips passing said sensing device during said reverse rotation of said drum, said control means providing a signal whereby said trap is kept in engagement with said predetermined chip to isolate same and terminate reverse rotation of said drum.

20. A data handling system in accordance with claim 19 and including an optical system, and means operative in response to said last-mentioned signal for cooperatively positioning said optical system with reference to said predetermined isolated chip to permit viewing thereof through said optical system.

21. A data handling system comprising a plurality of relatively thin data-bearing sheets each of generally planar rectangular configuration and each having a like code-bearing coplanar surface area, said code-bearing surface area of each being disposed in strip-like manner closely adjacent one straight edge of the respective data-bearing sheet, pneumatic means for sequentially propelling each of said data-bearing sheets along a path whereby said one straight edge thereof in motion defines a relatively fixed plane, and a code sensor disposed adjacent to said relatively fixed plane for sequentially sensing codes in said code-bearing areas during motion thereof.

22. A data handling system in accordance with claim 20 and including means for causing each of said data-bearing sheets to pivot and translate while being propelled as aforesaid.

23. A data-bearing film chip for data processing systems having chip holding means comprising, a generally planar film sheet of substantially rectangular configuration, said chip having a magnetic strip adapted to receive a magnetic code on the planar surface adjacent one straight edge thereof, said chip being formed with T-shaped means permitting attachment of said chip to said holding means, said T-shaped means being formed adjacent another straight edge of said chip.

24. A data-bearing film chip in accordance with claim 23 wherein said T-shaped means comprises a T-shaped notch formed in said chip, the stem of said notch being disposed centrally of and opening into said other edge of said chip.

References Cited in the file of this patent

UNITED STATES PATENTS

| | | |
|---|---|---|
| 584,228 | Marvin | June 8, 1897 |
| 1,126,645 | Lo Rentz | Jan. 26, 1915 |
| 1,543,605 | Gavard | June 23, 1925 |
| 1,595,881 | Schultz | Aug. 10, 1926 |
| 2,117,249 | Ireland | May 10, 1938 |
| 2,602,253 | Diamond | July 8, 1952 |
| 2,645,343 | Nemir | July 14, 1953 |
| 2,903,941 | Bornemann | Sept. 15, 1959 |

FOREIGN PATENTS

| | | |
|---|---|---|
| 1,099,085 | France | Mar. 16, 1955 |
| 799,427 | Great Britain | Aug. 6, 1958 |

UNITED STATES PATENT OFFICE
CERTIFICATE OF CORRECTION

Patent No. 3,045,529                                  July 24, 1962

Manfred R. Kuehnle

It is hereby certified that error appears in the above numbered patent requiring correction and that the said Letters Patent should read as corrected below.

In the grant, lines 2 and 12, and in the heading to the printed specification, line 4, name of assignee, for "Iter Corporation", each occurrence, read -- Itek Corporation --; column 2, line 9, for "and" read -- an --; line 60, for "is", third occurrence, read -- in --; column 5, line 3, for "48" read -- 38 --; column 6, line 62, for "B" read -- "B" --; line 74, for "C" read -- "C" --; column 9, line 18, strike out "optical", second occurrence.

Signed and sealed this 4th day of December 1962.

(SEAL)
Attest:

ERNEST W. SWIDER                            DAVID L. LADD
Attesting Officer                                Commissioner of Patents